United States Patent [19]

Willging

[11] Patent Number: 5,079,067
[45] Date of Patent: Jan. 7, 1992

[54] FORMALDEHYDE CONTAINING RESINS HAVING A LOW FREE FORMALDEHYDE

[75] Inventor: Stephen M. Willging, Minneapolis, Minn.

[73] Assignee: H. B. Fuller Company, Saint Paul, Minn.

[21] Appl. No.: 667,009

[22] Filed: Mar. 11, 1991

Related U.S. Application Data

[63] Continuation of Ser. No. 244,913, Sep. 15, 1988, abandoned.

[51] Int. Cl.⁵ .............................. B32B 3/28; C08K 9/00; C08L 3/04
[52] U.S. Cl. ............................ 428/182; 428/186; 523/208; 524/49; 524/701; 524/728; 524/843; 524/844
[58] Field of Search ............... 428/182, 186; 523/208; 524/49, 701, 728, 843, 844; 527/303; 528/227

[56] References Cited

U.S. PATENT DOCUMENTS

| | | | |
|---|---|---|---|
| 2,650,205 | 8/1953 | Kesler et al. | 527/303 |
| 2,884,389 | 4/1959 | Corwis et al. | 527/303 |
| 2,886,541 | 5/1959 | Langlois et al. | 527/303 |
| 2,890,182 | 6/1959 | Langlois et al. | 527/303 |
| 3,019,120 | 6/1962 | Bauer et al. | 106/213 |
| 3,294,716 | 12/1966 | Pinney | 527/303 |
| 4,009,311 | 2/1977 | Schoenberg | 428/182 |
| 4,033,914 | 7/1977 | Bovier et al. | 527/303 |
| 4,366,275 | 12/1982 | Silano et al. | 524/47 |

Primary Examiner—Kriellion S. Morgan
Attorney, Agent, or Firm—Merchant, Gould, Smith, Edell, Welter & Schmidt

[57] ABSTRACT

Formaldehyde containing resins used as curing, setting or crosslinking resins in a variety of natural product adhesives can be made with surprisingly low and novel levels of free formaldehyde, can be made using reactants that can remove free formaldehyde from the resin solution or from the adhesive.

19 Claims, 1 Drawing Sheet

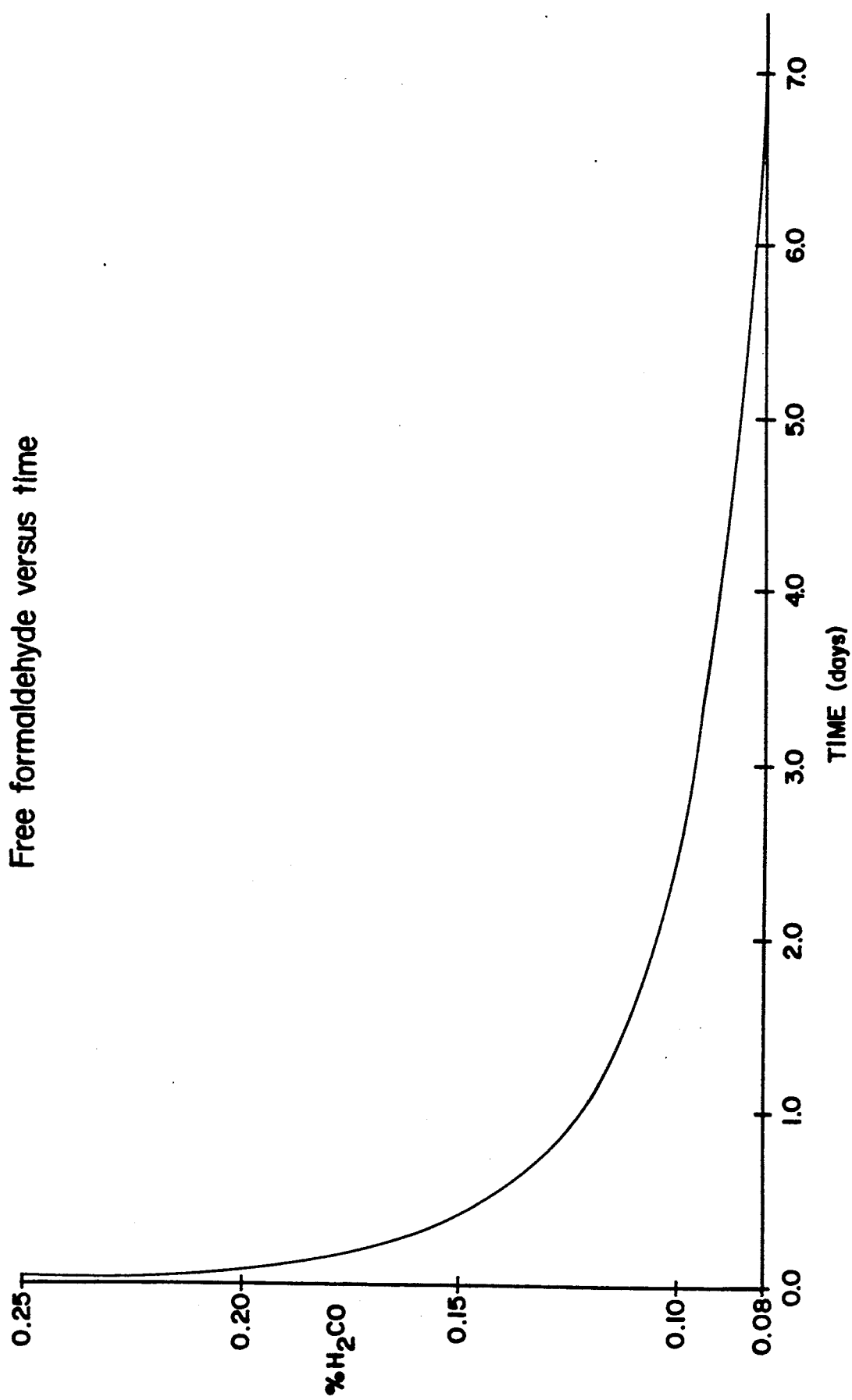

FORMALDEHYDE CONTAINING RESINS HAVING A LOW FREE FORMALDEHYDE

This is a continuation of application Ser. No. 244,913, filed Sept. 15, 1988, now abandoned.

FIELD OF THE INVENTION

The invention relates to formaldehyde containing resins that can be used in natural product adhesives. Such resins include urea-formaldehyde, resorcinol-formaldehyde, ketone-formaldehyde, phenol-formaldehyde, and similar resins formed in the reaction between formaldehyde and a carbonyl containing monomer having an acidic or reactive hydrogen on a carbon or nitrogen atom adjacent to the carbonyl. Such resins can suffer from the unwanted presence of or generation of free formaldehyde during manufacture, in storage, in adhesive blending, and in use. Typical formaldehyde resin containing adhesives can contain significantly greater than 0.3 wt. % free formaldehyde and can release amounts of free formaldehyde into the atmosphere in locations that manufacture, store, blend or use such formaldehyde containing resins.

More particularly, this invention relates to a novel ketone-formaldehyde resin having a free formaldehyde content that can be held substantially less than 0.3 wt. % free formaldehyde based on the aqueous resin composition. The invention also relates to natural product adhesives containing the resin such as a starch based corrugating board adhesive.

BACKGROUND OF THE INVENTION

Significant attention has been given in recent years to "waterproof" corrugated paperboard. Such water resistant treatments can take two forms, either the use of treated water resistant liners and corrugated media, or the use of water resistant adhesive.

Basic (pH>7) alkali metal containing starch based adhesives used in the manufacture of corrugating board have been known for many years. Corrugated board is typically manufactured by adhesively bonding at least one flat liner sheet to a sinusoidally formed corrugating medium. Starch based adhesives basically comprise starch in a soluble or suspended form, sodium hydroxide, borax and other additives. Such adhesives are formulated with a variety of components depending on end use. One additive found very useful in the manufacture of "water resistant" corrugated board are a variety of formaldehyde containing resins that, after application, when heated cure or crosslink to increase the water resistance of the corrugated glue line in the corrugated paper board. The lowest degree of moisture resistance required in corrugated board manufacture is found in boards that can resist the effect of high humidities for prolonged periods of time. At the other end of the scale of water resistance are wax coated corrugated boards that can resist full water immersion for a prolonged period.

U.S. Pat. No. 2,650,205 teaches an alkaline setting, resin-starch corrugating adhesive that can be used to form corrugated board. The patent discloses resins such as ketone-aldehyde resins, resorcinol-aldehyde resins, phenol-aldehyde resins, and other resins in combination with starch. Numerous other patents disclose the production in situ of water resistant waterproofing starch based corrugating adhesives including U.S. Pat. Nos. 2,884,389 and 2,886,541. U.S. Pat. No. 3,294,716 teaches the addition of borax to the general phenol-aldehyde starch formula to increase corrugating speeds in the corrugator.

One disadvantage of the "waterproofing" formaldehyde containing resins and alkaline-starch corrugating adhesives containing the formaldehyde resins is the generation of free formaldehyde. Such resins and the starch containing adhesives during manufacture, storage and use can generate amounts of free formaldehyde in solution that reach a concentration in excess of 0.3 wt. %. Since formaldehyde is volatile, the formaldehyde can rapidly be released into the atmosphere wherein annoying working conditions or toxic effects can be produced in the industrial site. A variety of alternative systems have been developed to reduce the content of free formaldehyde in the corrugating board adhesive. Primarily attention has been focused on the use of alternative formaldehyde-free crosslinking resins in the corrugating system. Attention has also been given to the use of water resistant components such as waxes and other hydrophobic compositions during the preparation of the board adhesive. Another solution to the formaldehyde problem is disclosed in Silano et al, U.S. Pat. No. 4,366,275, which teaches that formaldehyde can be reduced to a level of about 0.1-2 wt. % free formaldehyde using a dihydroxy ethylene urea compound. Silano indicates that it is not uncommon for acetone formaldehyde resins to have from 2 to 5% free (unreacted) formaldehyde in the resin composition. Silano reports that prior attempts to reduce formaldehyde levels in crosslinking adhesives are taught in U.S. Pat. Nos. 3,019,120 and 3,294,716. Silano indicates that his formaldehyde reduction results from the reaction between free formaldehyde and dihydroxy ethylene urea wherein the free formaldehyde reacts with terminal hydroxyl groups in the dihydroxyethyl urea to form methylol groups resulting in the removal of formaldehyde from solution through the formation of dimethylol dihydroxyethyl urea. Silano teaches at column 4, lines 42–62 that the free unreacted formaldehyde is generally controlled to a concentration between 0.1 to 2% by weight in the resin.

BRIEF DISCUSSION OF THE INVENTION

I have discovered that the free formaldehyde in formaldehyde containing resins or in alkaline starch containing corrugating adhesives can be reduced by scavenging free formaldehyde by reacting free formaldehyde with a nitrogen base and urea in the presence of an acid catalyst. Such a reaction scavenges the free formaldehyde and converts the free formaldehyde into a form that is trapped in a reaction product formed in the scavenging reaction. Through this reaction we have found that the levels of free formaldehyde in the resin can be reduced to amounts of less than 0.1 wt. % under optimum conditions.

While we do not wish to be held to a theory of action of the invention, we believe that free formaldehyde reacts with the amine to form a schiff base or an imine reaction product. The imine if made from ammonia and formaldehyde can rearrange and react to form an intermediate product, hexamethylenetetraamine. The use of another nitrogen base can result in an imine that can also rearrange and react to form a different intermediate. The imine (the hexamethylenetetraamine intermediate or other intermediate) can react with urea to form an N-substituted aminomethylene compound. Formaldehyde is ultimately sequestered in the form of the carbon in the amino methylene group in the N-substituted aminomethylene compound. Such compounds are sufficiently stable to act as the repository for the scavenged formaldehyde and can prevent the release of the free formaldehyde. We have found that in using this reaction scheme the amount of free formaldehyde can be reduced to less than 1% and less than 0.75 wt. %. At optimal concentrations of ammonia and urea, the residual or free formaldehyde can be reduced to less than 0.1 wt. %.

DESCRIPTION OF DRAWING

FIG. 1 is a plot of free formaldehyde versus time.

DETAILED DISCUSSION OF THE INVENTION

The crosslinking resins of this invention include resins formed in a reaction between formaldehyde and a carbonyl monomer having an acidic proton on a carbon or nitrogen atom adjacent to the carbonyl. Typical examples of such resins include ketone-formaldehyde (preferably acetone-formaldehyde), resorcinol-formaldehyde, phenol-formaldehyde and urea-formaldehyde resins. These resins are typically manufactured in aqueous alkaline solution through the catalyzed reaction between formaldehyde and the comonomer component. Sources of formaldehyde that can be used in the manufacture of the formaldehyde containing resins of the invention include gaseous formaldehyde, aqueous solutions of formaldehyde, trioxymethylene ($C_3H_6O_3$), hexamethylene tetraamine, paraformaldehyde, etc.

Comonomers that can be used in manufacture of the resins of this invention include ketones such as acetone, methylethyl ketone, acetophenone, benzophenone, cyclohexanone, etc.; phenolics useful in the invention include phenol, methyl phenol, amino phenol, etc.; resorcinol and substituted resorcinols; urea and N-substituted ureas are known. The preferred crosslinking resin in this invention comprises acetone-formaldehyde resins which are particularly useful in corrugating adhesives.

The crosslinking formaldehyde-containing resins of this invention are typically made in aqueous solution, with basic catalysis at a reaction temperature greater than about 100° F. The reaction proceeds through a natural thermic reaction wherein formaldehyde at a molar ratio of formaldehyde to comonomer of about 1-6:1, preferably about 2-5:1, reacts with the comonomer forming the crosslinking resin. The typical reaction schemes for the purpose of forming ketone formaldehyde, urea formaldehyde, phenol formaldehyde, resorcinol formaldehyde, and other formaldehyde containing resins are well known in the art.

After the reaction between the formaldehyde and its comonomers reaches equilibrium leaving some residual free formaldehyde, the reaction mixture can be treated with the amine base and urea in the presence of an acidic catalyst preferably having a pKa of greater than about 2 to scavenge the free formaldehyde. The reactants can be included in the reaction mixture prior to the polymerization of the formaldehyde and the comonomer, however yields and product quality can be reduced.

Amine reactants we have found useful include nitrogen bases of the formula

wherein R is independently hydrogen, alkyl, hydroxylalkyl, aryl, alkaryl, etc. and wherein at least one R is hydrogen. Such nitrogen bases include ammonia, monosubstituted amines and di-substituted amines. Typical examples of mono-substituted amines include methylamine, ethylamine, propylamine, hydroxyethylamine, tertiary butylamine, ethylene diamine, cyclohexyl amine, and others. Similarly, di-substituted amines we have found useful include dimethylamine, diethylamine, diethanolamine, hydroxyethyl propylamine, morpholine, dicyclohexylamine, and others.

Urea and ammonia are well known industrial chemicals. Ammonia can be obtained in the form of ammonia gas or ammonium hydroxide. Urea can be obtained in the form of a solid, powdered or prills or can be purchased in the form of aqueous urea solutions. While unsubstituted urea is the preferred reactant in Applicant's formaldehyde scavenging protocol, mono-substituted ureas can be used provided each urea molecule has at least one free hydrogen for reaction as a repository of the scavenged formaldehyde.

The formaldehyde scavenging reaction of the invention preferably involves an acid catalyst where the acid has a pKa of greater than about 2. We have found that strong acids having a pKa substantially less than 1 do not appear to have an appropriate catalytic effect. The use of strong acids does not always favor the complete sequestration of free formaldehyde. We have found that acids of moderate strength and their salts including acetic acid, oxalic acid, citric acid, phosphoric acid, carbonic acid (salts, i.e. ammonium carbonate, ammonium citrate), and others are particularly suitable for the reaction.

Starch

The starch based adhesives of this invention are commonly characterized as being either a carrier adhesive, a no carrier adhesive, or a carrier/no carrier adhesive. The term carrier adhesive implies the presence of a thin base of gelatinized starch in which ungelatinized or nonhydrated starch particles are emulsified or suspended. The term no carrier adhesive implies the substantial absence of gelatinized or hydrated starch in the adhesive emulsion. The term carrier/no carrier adhesive implies that the distinction between gelatinized starch and ungelatinized starch is not clear in the adhesive composition. Generally carrier/no carrier adhesives are prepared in a way that a substantial amount of partly hydrated or partly gelatinized starch is formed. These terms are imprecise since during the preparation of the starch based adhesives some starch inherently becomes gelatinized during processing at any temperature. However substantial proportions of starch remain ungelatinized and nonhydrated during preparation which can gelatinize and interact with the adhesive components during green bond formation.

The starch used in both the carrier phase and suspended starch phase is a commodity chemical produced from a number of root, stem or fruit, plant sources. Starch occurs naturally in the form of white granules and comprise linear and branched polysaccharide polymers. Starch is commonly manufactured by first soaking and grinding the plant starch source, and separating the starch from waste matter. The starch is commonly reslurried and processed into a finished dried starch product. Commercial starch often has the form of a pearl starch, powdered starch, high amylose starch, precooked or gelatinized starch, etc. Preferably pearl starch is used in making both the carrier phase and the particulate starch suspended in the carrier.

Base

The novel adhesive compositions of the invention contain a strong base which promotes the production of crosslinking species from the resin and acts to cure the adhesive. Essentially any strong base can be used, however preferred bases are alkali metal hydroxides. The most preferred strong bases include sodium and potassium hydroxide. The strong base also lowers the gel point of the starch, which increases the rate of hydration of the starch during curing of the glue line.

Boric Acid Compound

The novel adhesive compositions of the invention include a boric acid compound which cooperates with the gelatinized and nongelatinized starch during heating and curing by reacting with available hydroxyl groups of the starch, forming a starch borax complex which aids in gelling the carrier starch molecules and the suspended starch molecules. The cooperative reaction increases the tack of the adhesive and produces strong bonds. Any boric acid compound having free hydroxyl groups attached to the boron atom can be used, however commercial boric acid (orthoboric acid, $H_3BO_3$ and its hydrated forms $H_3BO_3$—$XH_2O$) and borax (sodium tetraborate decahydrate, $Na_2B_4O_7$—$XH_2O$ and other hydrate and anhydrous forms) are commonly used. For a discussion of boric acid compounds such as boron oxides, boric acids and borates, see Kirk-Othmer Encyclopedia of Chemical Technology, 2nd Edition, Vol. 3, pp. 608-652. The boric acid compound increases the tackiness, viscosity, and cohesive strength of the adhesive. As the adhesive cures in the glue line, a gel structure forms between the hydroxyl group of the polysaccharide, the basic acid compound and the PVOH. The exact mechanism of the crosslinking reaction between these compounds is unknown. Further, the borax buffers the caustic nature of the base used the adhesive stabilizing the adhesive to the hydrolytic effect of the base.

Polyvinyl Alcohol

Polyvinyl alcohol (PVOH) is a polyhydroxy polymer having a polymethylene backbone with pendent hydroxy groups produced by the hydrolysis of polyvinyl acetate. The theoretical monomer:

does not exist. Polyvinyl alcohol is one of the very few high molecular weight commercial polymers that is water soluble. It is commonly available a solid and is available in granular or powdered form. PVOH grades include a "super" hydrolyzed form (99.3% plus removal of the acetate group), a fully hydrolyzed form (99%+removal of the acetate group), a form of intermediate hydrolysis (about 98 to 91% removal of acetate group), and a partly hydrolyzed (about 91% to 85% removal of the acetate group) polyvinyl alcohol. The properties of the resins vary according to the molecular weight of the parent polymer and the degree of hydrolysis. Polyvinyl alcohols are commonly produced in nominal number average molecular weights that range from about 20,000 to 100,000. Commonly the molecular weight of commercial polyvinyl alcohol grades is reflected in the viscosity of a 4 wt. % solution measured in centipoise (cP) at 20° C. with a Brookfield viscometer. The viscosity of a 4% solution can range from about 5 to about 65 cP. Variation in film flexibility, water sensitivity, ease of solvation, viscosity, block resistance, adhesive strength, dispersing power can all be varied by adjusting molecular weight or degree of hydrolysis. Solutions of polyvinyl alcohol in water can be made with large quantities of lower alcoholic cosolvents and salt cosolutes. Polyvinyl alcohols can react with aldehydes to form acetals, an be reacted with..acrylonitrile to form cyanoethyl groups, and can be reacted with ethylene or propylene oxide to form hydroxy alkylene groups. Polyvinyl alcohols can be readily crosslinked and can be borated to effect gellation.

Polyvinyl alcohol is made by first forming polyvinyl acetate or a vinyl acetate containing copolymers such as an ethylene vinyl acetate copolymers and removing the acetate groups using a base catalyzed alkanolysis. The production of polyvinyl acetate or a vinyl acetate copolymer can be done by conventional processes which controls the ultimate molecular weight. Catalyst selection temperatures, solvent selection and chain transfer agents can be used by persons skilled in the art to control molecular weight. The degree of hydrolysis is controlled by preventing the completion of the alkanolysis reaction. Polyvinyl alcohol is made in the United States by Air Products & Chemicals, Inc. under the tradename AIRVOL ®, by duPont under the trade name ELVANOL ®, and by Monsanto under the trade name GELVITOL ®.

The preferred soluble polyvinyl alcohol compositions for use in this invention comprise polyvinyl alcohol made from a homopolymer or interpolymer of vinyl acetate that is partially hydrolyzed i.e. less than about 91% of the hydroxyl groups are free of acetate. The preferred partially hydrolyzed polyvinyl alcohol is available in low, medium or high molecular weight variations characterized by the Brookfield viscosity of a 4 wt. % aqueous solution at 20 degrees. The low molecular weight polyvinyl alcohol has a viscosity of about 4–10 cP, the medium molecular weight composition has a viscosity of about 15–30 cP and a high molecular weight composition has a viscosity of about 35–60 cP. The preferred polyvinyl alcohol compositions have a reduced particle size adapting the composition for rapid dissolution. The particle size of the most preferred polyvinyl alcohol is such that 99+% of the product will pass through a −80 mesh screen.

Crosslinking Resins

Resins that can be used in the novel adhesive compositions of this invention include resins that upon heating in basic media generate crosslinking species that react with and crosslink the hydroxyls in adjacent starch molecules. The crosslinking reagent tends to reduce the hydrophilic nature and the water solubility of the starch molecules by effectively removing the availability of hydroxyl groups to water and by introducing aliphatic alkylene-type crosslinking moieties.

A preferred class of crosslinking resins comprise well known condensation products of the reaction of a ketone and an aldehyde compound. These resins are characterized as a polyketone polyether polymer but can contain a variety of other monomers such as urea, melamine, etc. In the presence of heat and base, they commonly decompose to produce species that effectively crosslink the starch molecules. Preferred resins are acetone-formaldehyde resins, acetone-urea-formaldehyde resins, acetone-melamine-formaldehyde resins comprising 15 to 30 wt. % acetone, about 5 to 50 wt. % formaldehyde and 0-15 wt. % of third monomer.

Wax

The term wax is used very broadly and is applied to a wide variety of materials. The materials can have properties resembling certain well known waxes or can be used to provide physical properties similar to those associated with well known properties of wax such as sealing, polishing, candle making, etc. Many waxy substances have been found in nature and have been known to be useful for many years.

Historically waxes include substances that are natural products. Chemically natural waxes are esters of fatty acids and monohydric fatty alcohols. Physically waxes are water repellant solids having a useful degree of plastic character. However, modern waxes include various synthetic substances that can replace natural waxes in many preparations. The composition of natural waxes generally comprise an ester of a saturated fatty acid and a long chain monohydric alcohol. Long chain fatty acids often include acids having greater than 16 carbon atoms and most commonly about 26 carbon atoms. The aliphatic monohydric alcohol commonly has at least 14 and can range as high as 36 carbon atoms. Petroleum, mineral or other synthetic waxes often consist of saturated hydrocarbons having aliphatic or open chain structures with relatively low branching or side chains.

Particularly preferable waxes for the water resistant corrugated board adhesive are waxes such as petroleum waxes, candelilla wax, beeswax, etc. Particularly preferred waxes are the petroleum waxes such as microcrystalline waxes, slack waxes and paraffin waxes.

In somewhat greater detail, the crosslinking formaldehyde containing resin of the invention is typically manufactured by an aqueous reaction between formaldehyde and the second monomer containing a carboxyl group and an acidic hydrogen on an adjacent atom, typically a nitrogen or carbon atom. Preparation of the resin typically involves a first reaction between the monomer and formaldehyde in a mole ratio of about 1 mole of the first monomer to about 1-6 moles of formaldehyde, preferably 3-5 moles of formaldehyde under alkaline conditions at a temperature of about 20°-100° C., preferably 30°-80° C. Alkaline catalysts that can be used in preparation of the formaldehyde containing resins of this invention include typically strong organic and inorganic bases. Preferred catalysts include inorganic bases based on alkali metal compounds. Such bases include sodium hydroxide, potassium hydroxide, calcium hydroxide, magnesium hydroxide, etc. Additionally, salts of the strong bases can also be used such as, trisodium phosphate, tripotassium phosphate, etc. The reaction is typically conducted under ordinary atmospheric conditions but can be run under an inert atmosphere. Such atmospheres can include nitrogen, carbon dioxide, argon or others. The alkalinity and reaction temperature must be controlled to produce the water soluble condensate but is not cured to an extent that an insoluble, strongly crosslinked reaction product is produced. Typically the pH of the reaction mixture is maintained at greater than about 7, typically at the end of the reaction the pH of the batch is between 7 and 8. Reaction times depend mainly on temperature, alkalinity and desired solid content of the product. The product is typically about 50-60 wt. % solids and contains about 30-50% formaldehyde and about 10-25% of the second monomer based on the solids.

In the manufacture of an acetone formaldehyde resin, a suitably sized reactor equipped with a condenser can be charged with water, acetone and formaldehyde wherein the ratio between acetone and formaldehyde is about 4 moles of formaldehyde per mole of acetone. After the acetone, formaldehyde and water are fully mixed, reaction between the reactants can be initiated upon the addition of an alkaline material. Upon the addition of alkaline initiators, the reaction mixture typically produces exothermic heat, addition of alkaline initiator should be controlled to maintain the temperature at less than 150° F.

After the reaction is complete, the reaction product can be analyzed for free formaldehyde and then treated with appropriate amounts of nitrogen base, acid and urea. After the addition of the reactants, the pH of the reaction mixture can be lowered by the presence of the acid catalyst, however remains greater than 7. The reaction temperature is ordinarily maintained at above 20° C., typically 30°-60° C. The reaction is allowed to proceed until the free formaldehyde level in the reaction mixture is reduced to below 1%, but often quickly falls to between 0.1-0.6%. As is shown in the data on the subsequent pages, even after the reaction is complete, the formaldehyde concentration can vary with time and can often after standing fall to less than 0.1%.

Typical proportions of the formaldehyde scavenger reactants can be found in the following table:

TABLE 1

| Amounts of Components (Wt-% of Aqueous Resin) | | | |
|---|---|---|---|
| Ingredient | Useful | Preferred | Most Preferred |
| Nitrogen base | 0.01-15 | 0.1-10 | 0.5-8 |
| Urea | 0.1-10 | 0.25-8 | 0.5-5 |
| Acid | 0.01-5 | 0.05-2 | 0.1-0.5 |

While the crosslinking additive of this invention can be used with a variety of natural product adhesives, the additive is typically used in a starch based corrugating board adhesive. The corrugating adhesive compositions of the invention can be made by combining a starch slurry with alkali metal base in water and heating the mixture to at least partly gelatinize the starch. Once the starch is gelatinized to the desired extent, the remaining components which can include borax, wax, polyvinyl alcohol, crosslinking reagent and others can then be added. The typical proportions of ingredients can be found in the following table.

TABLE 2

| Ingredient | Useful | Preferred | Most Preferred |
|---|---|---|---|
| Starch | 5-50 | 10-50 | 12-50 |
| Alkali metal base | 0.1-10 | 0.2-5 | 0.5-3 |
| Borax | 0.1-5 | 0.2-4 | 0.3-3 |
| Polyvinyl alcohol | 0-5 | 0.1-4 | 0.2-3 |
| Crosslinking resin | 0.1-5 | 0.1-4 | 0.2-3 |
| Wax emulsion | 0-5 | 0.1-4 | 0.2-3 |

The following Examples further illustrate certain embodiments of the invention and include a best mode.

EXAMPLE I

A series of resin preparations (1–23 in the following Table 3) using the formaldehyde reducing protocol were conducted by adding to a small glass jar 100 grams of a 56 wt. % aqueous acetone-formaldehyde resin, and the amounts of urea, 26 wt. % aqueous ammonia and citric acid shown in the following Table 3. The mixture was heated and stirred in the glass jar with a stirring rod for the time listed in the following Table 3. The formaldehyde content was monitored and recorded after the initial reaction equilibrated, 24 hours after initial equilibration, and then 1 week after. The content of free formaldehyde is also displayed in the following Table 3. Note that under certain conditions the free formaldehyde content is below 0.1 after 1 week of reaction.

TABLE 3

| Run No. | Citric Acid (Grams) | Ammonia (28%) (Grams) | Urea Grams | Time (Hrs.) | Temp. (°C.) | Initial pH | % Free CH$_2$O | After 24 Hrs. pH | % Free CH$_2$O | After 1 Week pH | % Free CH$_2$O |
|---|---|---|---|---|---|---|---|---|---|---|---|
| 1 | 0.38 | 0.75 | 1.25 | 1.25 | 34 | 7.1 | 0.467 | 7.1 | 0.346 | 7.1 | 0.255 |
| 2 | 0.25 | 3.00 | 2.50 | 1.00 | 43 | 9.2 | 0.243 | 8.8 | 0.131 | 8.0 | 0.098 |
| 3 | 0.38 | 2.25 | 1.25 | 1.25 | 34 | 8.9 | 0.205 | 8.4 | 0.205 | 7.5 | 0.098 |
| 4 | 0.25 | 1.50 | 2.50 | 1.00 | 60 | 6.7 | 0.439 | 6.7 | 0.271 | 6.8 | 0.196 |
| 5 | 0.13 | 2.25 | 1.25 | 1.25 | 51 | 8.2 | 0.205 | 8.2 | 0.140 | 7.9 | 0.088 |
| 6 | 0.25 | 1.50 | 2.50 | 1.00 | 25 | 8.3 | 0.336 | 7.8 | 0.215 | 7.4 | 0.108 |
| 7 | 0.38 | 2.25 | 1.25 | 0.75 | 51 | 8.8 | 0.224 | 8.2 | 0.159 | 7.7 | 0.088 |
| 8 | 0.25 | 1.50 | 2.50 | 1.00 | 43 | 7.6 | 0.327 | 7.2 | 0.271 | 7.3 | 0.137 |
| 9 | 0.38 | 2.25 | 3.75 | 0.75 | 34 | 9.4 | 0.318 | 8.5 | 0.196 | 7.8 | 0.078 |
| 10 | 0.25 | 1.50 | 2.50 | 0.50 | 43 | 8.1 | 0.364 | 7.5 | 0.318 | 7.3 | 0.147 |
| 11 | 0.25 | 0.00 | 2.50 | 1.00 | 43 | 5.8 | 0.925 | 5.7 | 0.626 | 5.8 | 0.461 |
| 12 | 0.38 | 2.25 | 3.75 | 1.25 | 51 | 8.4 | 0.224 | 7.9 | 0.205 | 7.5 | 0.069 |
| 13 | 0.38 | 0.75 | 1.25 | 1.25 | 51 | 6.1 | 0.701 | 5.9 | 0.486 | 6.2 | 0.294 |
| 14 | 0.13 | 0.75 | 3.75 | 0.75 | 34 | 7.1 | 0.579 | 7.0 | 0.392 | 7.3 | 0.255 |
| 15 | 0.38 | 0.75 | 3.75 | 1.25 | 34 | 6.3 | 0.618 | 6.3 | 0.353 | 6.5 | 0.216 |
| 16 | 0.38 | 0.75 | 3.75 | 0.75 | 51 | 6.3 | 0.500 | 6.3 | 0.383 | 6.4 | 0.235 |
| 17 | 0.25 | 1.50 | 5.00 | 1.00 | 43 | 7.7 | 0.275 | 7.5 | 0.245 | 7.5 | 0.147 |
| 18 | 0.50 | 1.50 | 2.50 | 1.00 | 43 | 6.5 | 0.383 | 6.6 | 0.245 | 6.7 | 0.206 |
| 19 | 0.25 | 1.50 | 0.00 | 1.00 | 43 | 7.6 | 0.343 | 7.4 | 0.245 | 7.2 | 0.167 |
| 20 | 0.00 | 1.50 | 2.50 | 1.00 | 43 | 9.2 | 0.373 | 9.0 | 0.314 | 9.1 | 0.353 |
| 21 | 0.13 | 2.25 | 3.75 | 1.25 | 34 | 9.7 | 0.226 | 8.7 | 0.167 | 8.2 | 0.069 |
| 22 | 0.13 | 0.75 | 1.25 | 0.75 | 51 | 6.8 | 0.599 | 6.8 | 0.402 | 6.9 | 0.285 |
| 23 | 0.25 | 1.50 | 2.50 | 1.50 | 43 | 8.0 | 0.226 | 7.9 | 0.186 | 7.3 | 0.108 |

EXAMPLE II

The procedure of Example I was followed with the following differences: 100 grams Michemrez 400 acetone-formaldehyde resin, 3.0 grams 26% aqueous ammonia, 0.5 grams citric acid; heated and stirred at 50° C. for 30 minutes and then 5 grams urea were added. The formaldehyde content is shown in Table 4 below.

TABLE 4

| Formaldehyde Concentration of Example II | | | |
|---|---|---|---|
| Before Treatment | Initial | 24 Hours | 1 Week |
| 1.3% | 0.17% | 0.08% | 0.08% |

EXAMPLE III

Example II was repeated with Bordon WS-189-84 acetone-formaldehyde resin.

TABLE 5

| Formaldehyde Concentration of Example III | | | |
|---|---|---|---|
| Before Treatment | Initial | 24 Hours | 1 Week |
| 1.55% | 0.18% | 0.10% | 0.05% |

EXAMPLE IV

Example I, Run No. 18 was repeated with 3.0 grams of monoethanolamine substituted for the aqueous ammonia and 5.0 grams of urea substituted for the 2.50 grams of urea.

TABLE 6

| Formaldehyde Concentration of Example IV | | | |
|---|---|---|---|
| Before Treatment | Initial | 24 Hours | 1 Week |
| 1.2% | 0.22% | 0.09% | 0.15% |

EXAMPLE V

Example IV was repeated except that 5.0 grams of diethanolamine was used.

TABLE 7

| Formaldehyde Concentration of Example V | | | |
|---|---|---|---|
| Before Treatment | Initial | 24 Hours | 1 Week |
| 1.2% | 0.67% | 0.3% | 0.65% |

EXAMPLE VI

To a small glass jar was added 75 grams of an aqueous acetone formaldehyde resin prepared by the basic catalyzed condensation reaction of 4 moles of formaldehyde with 1 mole of acetone and containing 1.15 wt. % free formaldehyde. To the aqueous resin was added 1.88 grams of 26 wt. % aqueous ammonia and 0.23 grams glacial acetic acid. The mixture was heated for 30 minutes at 50° C. and 3.75 grams of urea was added. After the urea had dissolved the mixture was cooled to room temperature and the free formaldehyde content was monitored by cold sulfite titration.

TABLE 8

| Formaldehyde Concentration of Example VI | | | |
|---|---|---|---|
| Initial | 24 Hours | 48 Hours | 6 Days |
| 0.18% | 0.22% | 0.19% | 0.10% |

EXAMPLE VII

Example VI was repeated except that 1.88 grams of 26 wt. % of aqueous ammonia and 0.53 grams of ammonium sulfate was substituted for the 1.88 grams of 26 wt. % aqueous ammonia and 0.23 grams of glacial acetic acid.

TABLE 9

Formaldehyde Concentration of Example VII

| Initial | 24 Hours | 48 Hours | 6 Days |
|---------|----------|----------|--------|
| 0.10%   | 0.16%    | 0.15%    | 0.13%  |

EXAMPLE VIII

To a small glass jar was added 50 grams of an aqueous acetone formaldehyde resin containing 2.0 wt. % free formaldehyde. To the jar was added 0.9 grams of ammonium carbonate and 2.5 grams of urea. The mixture was stirred to dissolve the urea and ammonium carbonate salt. Evolution of gas was observed and then the mixture was heated on a water bath to 55° C. for one hour. Additional gas of evolution was observed. After cooling to room temperature the free formaldehyde content was 0.15 wt. %. After standing for 3 days the formaldehyde content had fallen to 0.08%.

EXAMPLE IX

To 348 grams of an aqueous acetone formaldehyde resin containing 1.3 wt. % free formaldehyde was added 7.5 grams diammonium phosphate. The mixture was stirred for 3 hours at room temperature. After 3 hours the free formaldehyde content had fallen to 0.32%. After standing overnight 300 grams of the above mixture was treated with 30 grams of urea. After 2 hours at room temperature, the free formaldehyde content was 0.19 wt. %.

Formaldehyde Titration

The free formaldehyde in the above Examples was measured through a cold sulfite titration in which free formaldehyde is reacted with sodium sulfite producing a stoichiometric amount of hydroxide ($OH^-$) which is back titrated with hydrochloric acid. In the procedure a 1 molar solution of sodium sulfite (63.0 grams of $Na_2SO_3$ and 500 milliliters of deionized water) is prepared. A 50 millimeter graduated cylinder is used in conjunction with 150 milliliter and 250 milliliter Erlenmeyer flasks and a 50 milliliter pipette. A 0.04% thymolphthalein solution in 50 wt. % aqueous ethanol is used. A magnetic stir bar and stir plate can be used. An 0.1 N hydrochloric acid and an 0.05 N sodium hydroxide solution are used as titrators.

About 3 grams of the thoroughly homogeneous resin is placed in a 250 milliliter Erlenmeyer flask. The weight of aqueous resin is measured to two decimal places. 15 milliliters of a 1 molar sodium sulfite solution is placed into a separate 125 milliliter Erlenmeyer flask. To each flask is added 4 drops of the thylphthalein solution and some ice chips. Sufficient drops of 0.05 normal sodium hydroxide solution is added to turn the sample slightly blue. The solutions are titrated separately to colorless with the hydrochloric acid solution. At that time the cold sodium sulfite solution is added to the resin sample. The mixture should turn blue in color. The mixture is then again titrated with standardized hydrochloric acid solution to a colorless end point. The volume of the acid required to neutralize the mixture is recorded, the percent of free formaldehyde in the original sample is given by the following equation:

$$\% \text{ Free Formaldehyde} = \frac{(\text{volume HCl}) \times (\text{Normality HCl}) \times (3)}{(\text{weight of the sample})}$$

The above Examples and tables of data clearly indicate that the concentration of free formaldehyde in the formaldehyde containing resins can be reduced to less than 0.1 wt. % based on the aqueous resin composition. Such reduction can be achieved through the use of a variety of nitrogen bases including ammonia, monoethanolamine, diethanolamine and others. Additionally a variety of acids can be used including citric acid, phosphoric acid, acetic acid, sulfuric acid and others. Additionally the volatile amine and the acid can be used in the form of a prereacted product between the volatile base and the acid (ammonium sulfate).

The above specification, Examples and data provide a complete explanation of the invention, however since many embodiments of the invention can be made without departing from the spirit and scope of the invention, the invention resides in the claims hereinafter appended.

What is claimed is:

1. A process for the preparation of an aqueous crosslinking resin comprising formaldehyde and a carbonyl containing monomer, having an acidic hydrogen on an atom adjacent to the carbonyl, which process comprises reacting about 1 to 6 moles of formaldehyde with about 1 mole of the carbonyl containing monomer under aqueous alkaline conditions to form a free formaldehyde containing resin and reacting the free formaldehyde in the resin with 0.2 to 5.0 moles of a nitrogen base selected from the group consisting of ammonia or a primary amine, about 0.01 to 0.3 mole of an acid and about 0.01 to 6.0 moles of a urea compound each per mole of free formaldehyde, wherein the final aqueous resin reaction product contains less than about 0.3 wt. % free formaldehyde.

2. The process of claim 1 wherein the carbonyl monomer has a nitrogen or carbon adjacent to the carbonyl.

3. The process of claim 2 wherein the carbonyl containing monomer comprises a ketone, a phenol compound, a urea compound or mixtures thereof.

4. The process of claim 3 wherein the ketone comprises acetone.

5. The process of claim 1 wherein the nitrogen base comprises ammonia.

6. The process of claim 1 wherein the acid comprises an acid having a pKa of greater than 2.

7. An aqueous formaldehyde-containing crosslinking resin composition which comprises:
   (a) a major portion of water;
   (b) a soluble resin solids phase comprising:
     (i) resin bound formaldehyde;
     (ii) about 1 mole of a carbonyl containing monomer having an acidic hydrogen adjacent to the carbonyl per each 1-6 moles of resin bound formaldehyde; and
   (c) less than 0.3 wt. % free formaldehyde; wherein the free formaldehyde concentration is due to a reaction between free formaldehyde and:
     (i) about 0.2 to 5.0 moles of a nitrogen base comprising ammonia or a primary amine;
     (ii) about 0.01 to 0.3 mole of an acid; and
     (iii) about 0.01 to 6.0 moles of urea;
     each per mole of free formaldehyde.

8. The resin of claim 7 wherein the carbonyl containing monomer comprises a ketone, a phenol, a urea compound, or mixtures thereof.

9. The resin of claim 7 wherein the ketone comprises acetone.

10. The resin of claim 7 wherein the nitrogen base comprises ammonia.

11. The resin of claim 7 wherein the acid comprises an acid having a pKa of greater than 2.

12. The resin of claim 7 wherein the final reaction product contains less than 0.1 wt. % free formaldehyde.

13. A starch based corrugating adhesive which comprises in an aqueous base:
(a) about 10 to 40 wt. % of starch;
(b) about 0.2 to 1.0 wt. % of an alkali metal hydroxide;
(c) about 0.1 to 0.5 wt. % of a boric acid compound, a boron oxide compound or a borate compound;
(d) about 0.1 to 5 wt. % of a formaldehyde containing crosslinking resin, the percentages based on the aqueous adhesive, said resin comprising:
(i) resin bound formaldehyde;
(ii) about 1 mole of resin bound ketone per each 1 to 6 moles of formaldehyde;
(iii) about 0.2 to 5.0 moles of a nitrogen base which comprises ammonia or a primary amine;
(iv) about 0.01 to 0.3 mole of an acid; and
(v) about 0.01 to 6.0 moles of urea;
each per mole of free formaldehyde, which react to limit the concentration of free formaldehyde to less than 0.3 wt. %.

14. The adhesive of claim 13 wherein the ketone comprises acetone.

15. The adhesive of claim 13 wherein the nitrogen base comprises ammonia.

16. The adhesive of claim 13 wherein the acid comprises an acid having a pKa of greater than 2.

17. The adhesive of claim 13 wherein the final reaction product contains less than 0.1 wt. % free formaldehyde.

18. An acetone formaldehyde resin which comprises an aqueous solution containing:
(a) resin bound acetone;
(b) about 3 to 5 moles of resin based formaldehyde per mole of acetone; and
(c) less than 0.1 wt. % free formaldehyde;
wherein the aqueous solution contains about 30 wt. % or greater resin solids.

19. An aqueous formaldehyde-acetone crosslinking resin composition which comprises:
(a) a major portion of water;
(b) a soluble resin solids phase comprising:
(i) resin bound formaldehyde;
(ii) about 1 mole of acetone per each 1 to 6 moles of formaldehyde; and
(c) less than 0.3 wt. % free formaldehyde;
wherein the free formaldehyde concentration is due to a reaction between residual formaldehyde and;
(i) about 0.2 to 5.0 moles of ammonia;
(ii) about 0.01 to 0.3 mole of an acid having a pK greater than about 2; and
(iii) about 0.01 to 6.0 moles of urea;
each per mole of free formaldehyde.

* * * * *